US012258868B2

(12) United States Patent
Connor, Jr. et al.

(10) Patent No.: US 12,258,868 B2
(45) Date of Patent: Mar. 25, 2025

(54) SYSTEM AND METHOD FOR AN IN-CONDUIT HYDROTURBINE

(71) Applicant: InPipe Energy, Inc., Portland, OR (US)

(72) Inventors: Michael Connor, Jr., Saint Clair, MI (US); Thomas Beales, Houston, TX (US); Gregory T. Semler, Belvedere, CA (US)

(73) Assignee: INPIPE ENERGY, INC., Portland, OR (US)

( * ) Notice: Subject to any disclaimer, the term of this patent is extended or adjusted under 35 U.S.C. 154(b) by 32 days.

(21) Appl. No.: 18/190,672

(22) Filed: Mar. 27, 2023

(65) Prior Publication Data

US 2024/0328326 A1 Oct. 3, 2024

(51) Int. Cl.

*F01D 15/10* (2006.01)
*F01D 17/08* (2006.01)
*F01D 21/14* (2006.01)
*F02B 37/18* (2006.01)

(52) U.S. Cl.

CPC ............. *F01D 15/10* (2013.01); *F01D 17/08* (2013.01); *F01D 21/14* (2013.01); *F02B 37/183* (2013.01); *F05D 2220/76* (2013.01); *F05D 2270/02* (2013.01); *F05D 2270/3013* (2013.01); *F05D 2270/44* (2013.01); *F05D 2270/54* (2013.01)

(58) Field of Classification Search

CPC ........ F01D 15/10; F01D 17/08; F02B 37/183; F05D 2220/76; F05D 2270/02; F05D 2270/3013; F05D 2270/44; F05D 2270/54

See application file for complete search history.

(56) References Cited

U.S. PATENT DOCUMENTS

| | | | | | |
|---|---|---|---|---|---|
| 3,808,794 | A * | 5/1974 | Wood | F01D 15/00 60/671 |
| 4,496,845 | A | 1/1985 | Ensign et al. | |
| 4,654,537 | A * | 3/1987 | Gaspard | F03B 13/00 416/DIG. 4 |
| 4,658,587 | A * | 4/1987 | Ecomard | F02B 37/183 60/602 |
| 4,809,510 | A * | 3/1989 | Gaspard | F03B 13/00 416/DIG. 4 |

(Continued)

FOREIGN PATENT DOCUMENTS

| | | | | |
|---|---|---|---|---|
| GB | 2191248 A * | 12/1987 | F03B 13/00 |
| JP | 2009138633 A | 6/2009 | |
| KR | 101555433 B1 | 10/2015 | |

OTHER PUBLICATIONS

ISA Korean Intellectual Property Office, International Search Report and Written Opinion Issued in Application No. PCT/US2024/012979, May 31, 2024, WIPO, 10 pages.

*Primary Examiner* — Pedro J Cuevas
(74) *Attorney, Agent, or Firm* — McCoy Russell LLP

(57) ABSTRACT

System and methods for an electric power generating system are described. In one example, the electric power generating system includes a controller that adjusts a speed of a turbine that is located along a bypass conduit via a regenerative drive in response to a downstream pressure. The electric power generating system also includes a bypass valve that is located along the bypass conduit to control a system pressure when the turbine is not adjusted responsive to the downstream pressure.

19 Claims, 8 Drawing Sheets

(56) References Cited

U.S. PATENT DOCUMENTS

| | | | | |
|---|---|---|---|---|
| 8,680,704 | B1 * | 3/2014 | Rooney | F03B 13/02 290/54 |
| 9,611,627 | B2 * | 4/2017 | Schreiner | F02C 9/18 |
| 10,247,100 | B2 * | 4/2019 | Leamy | F01D 17/14 |
| 10,947,953 | B2 * | 3/2021 | Burns | F03B 7/00 |
| 11,041,476 | B2 * | 6/2021 | Abe | F03B 15/16 |
| 11,946,604 | B2 * | 4/2024 | Semler | F03B 13/08 |
| 2012/0261921 | A1 | 10/2012 | Kaiser | |
| 2013/0092126 | A1 | 4/2013 | Leone et al. | |
| 2014/0158242 | A1 * | 6/2014 | Schreiner | E03B 7/09 60/785 |
| 2014/0265328 | A1 * | 9/2014 | Van Blerk | F03B 11/004 290/43 |
| 2015/0260151 | A1 * | 9/2015 | Kang | F03B 15/16 700/282 |
| 2021/0310221 | A1 * | 10/2021 | Semler | H02K 7/1823 |
| 2022/0128044 | A1 * | 4/2022 | Semler | F03B 13/00 |
| 2024/0142064 | A1 * | 5/2024 | Semler | F17D 5/00 |

* cited by examiner

SYSTEM AND METHOD FOR AN IN-CONDUIT HYDROTURBINE

FIELD

The present description relates to operating an in-conduit hydroturbine that controls pressure of a fluid placed in parallel with a pressure control valve of similar function.

BACKGROUND AND SUMMARY

A fluid distribution system may receive a fluid at a pressure that is greater than fluid consumers may wish to receive the fluid. For example, a water distribution system may receive water from a pump or from a reservoir that is geographically above water consumers such that the water is supplied at a higher pressure than may be desired. The desired pressure (e.g., a desired downstream pressure) for fluid consumers may fall into an acceptable pressure range (APR). The APR may be based on a maximum pressure limitation of connected equipment (e.g., piping and/or valves), pressure required to reduce leakage, and cost of pumping energy. A minimum pressure of the APR may be based on a minimum operating pressure for connected appliances (e.g., washers, boilers, showers, etc.), and a minimum pressure for fire suppression equipment during a fire flow event. A fluid distribution system may include a plurality of pressure control zones so that fluid consumers receive the fluid in the APR. A pressure control zone pressure of the fluid is an area that is in a specified geographical region and elevation. A pressure control zone may include a pressure reducing station that includes a pressure reducing valve that lowers pressure at an inlet of the pressure reducing valve to a regulated lower pressure irrespective of upstream pressure changes and flow rate changes. While the pressure reducing valve is effective to lower pressure of the fluid, the pressure reducing valve may exhibit energy losses that result in wasted energy. A fixed speed turbine may be deployed in place of the pressure reducing valve or in parallel with the pressure reducing valve, but such a configuration may lack operational redundancy and/or require additional pressure controls to ensure a desired pressure is provided at a downstream position in the fluid distribution system.

The inventors herein have recognized the above-mentioned issues and have developed an electrical power generating system, comprising: a bypass conduit including a bypass control valve and a turbine; a primary conduit including a primary control valve; and a controller including executable instructions stored in non-transitory memory that causes the controller to adjust a speed of the turbine in response to a downstream pressure.

By adjusting a speed of a hydroturbine in response to a downstream pressure in an electrical power generating system, it may be possible to increase operating efficiency of an electrical power generating system that generates electrical power via a fluid. In particular, the speed of the hydroturbine may be increased to increase a pressure drop across the hydroturbine so that pressure drop across a bypass valve may be minimized, thereby maximizing system electrical power output and performance.

The present description may provide several advantages. In particular, the approach may improve electrical power generating system efficiency. Further, the approach may provide a sequenced approach to start a hydroturbine in a way that may reduce losses and improve system efficiency. Additionally, the approach may simplify control of a system in which two devices may be operated to control downstream pressure in a fluid distribution system.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
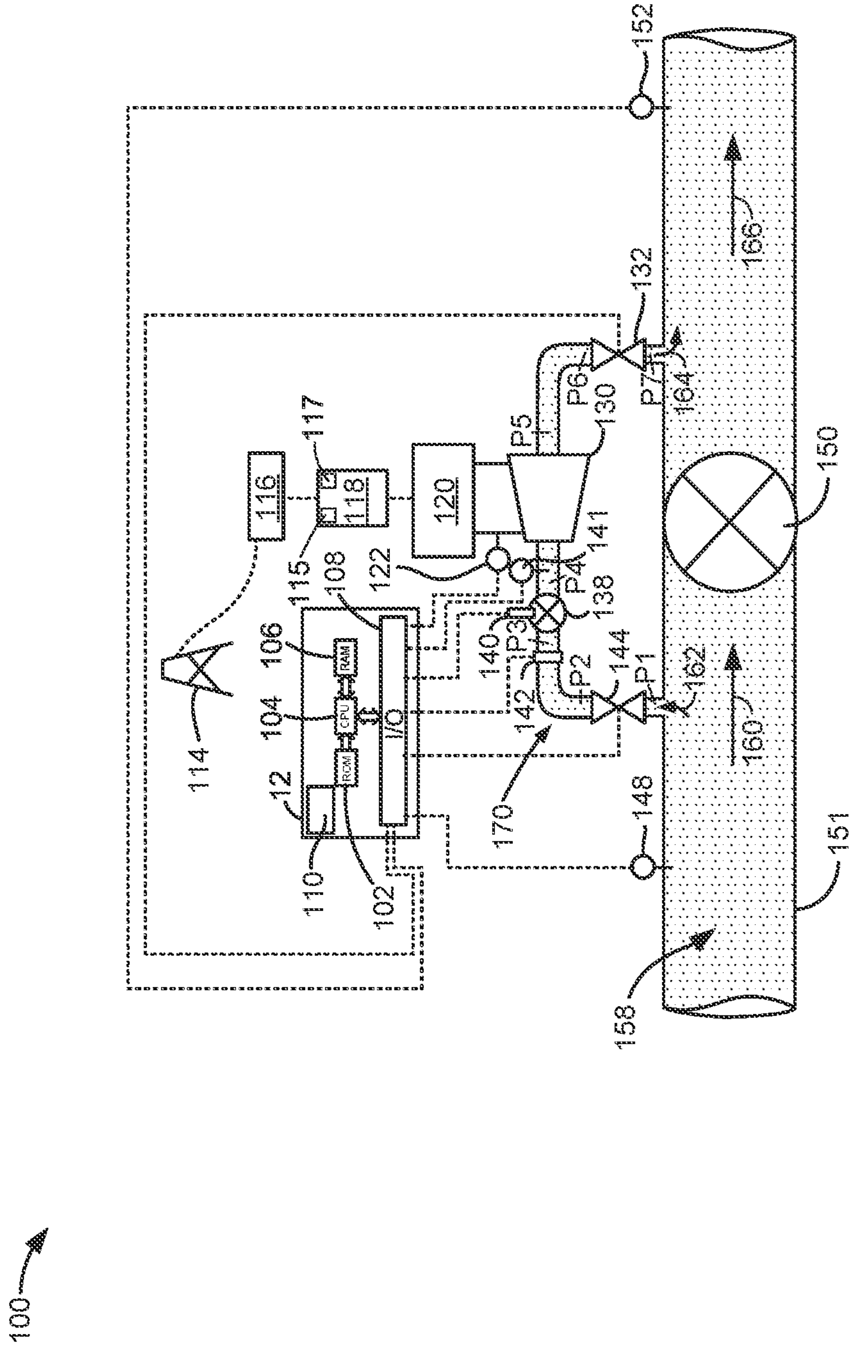
FIG. 1 is a schematic diagram of an example electrical power generating system.
Figure 2:
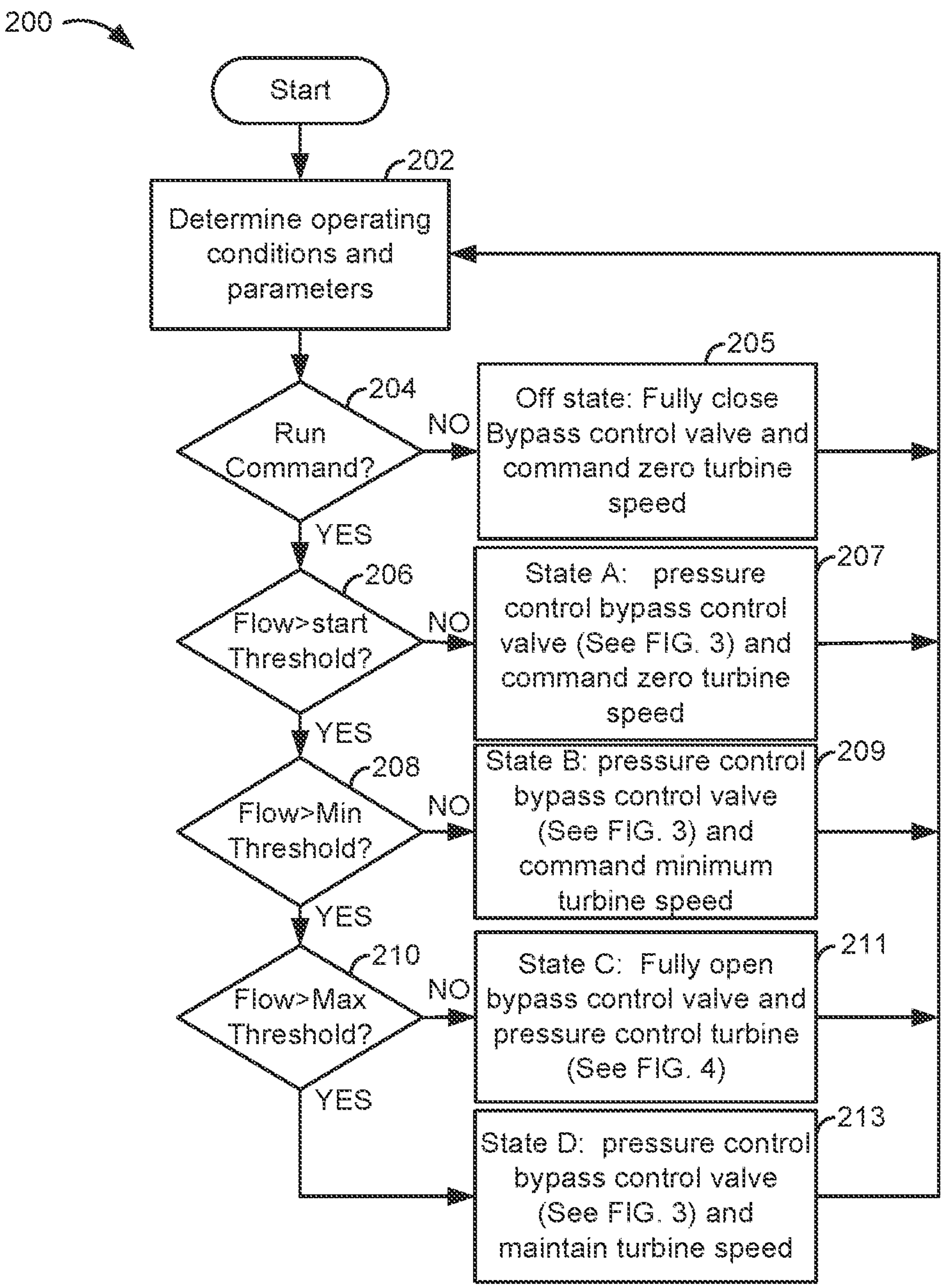
FIGS. 2-4 show flowcharts of example methods for operating the electrical power generating system.
Figure 3:
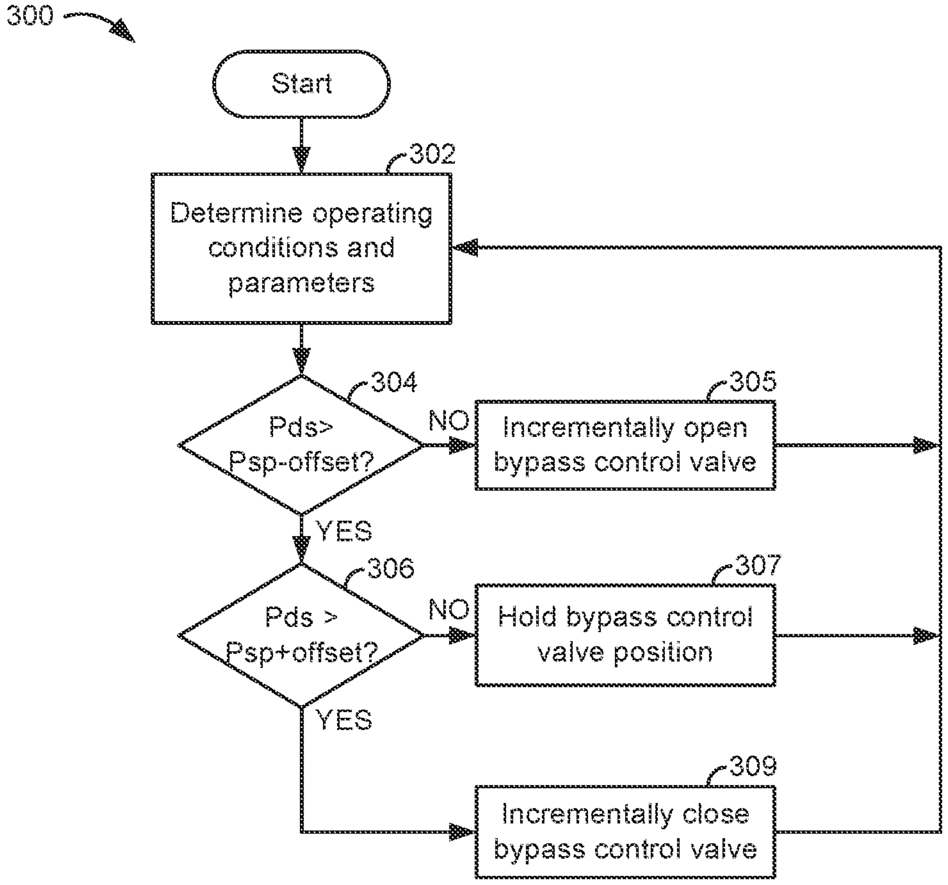
Figure 4:
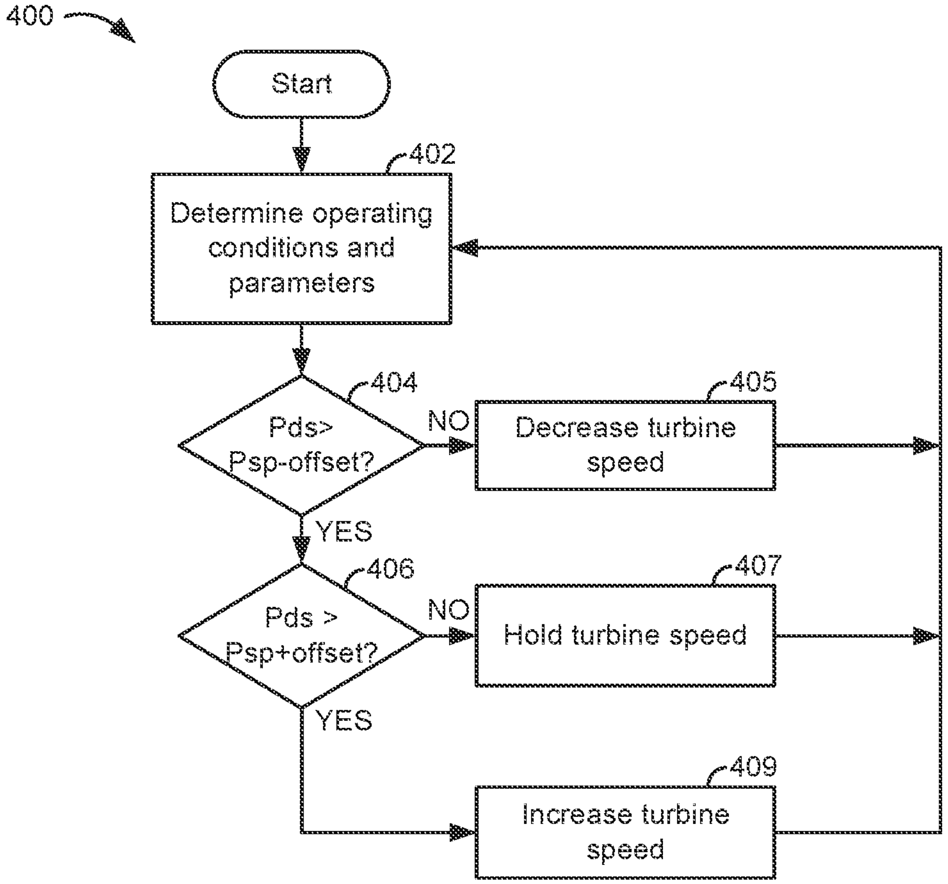
Figure 5:
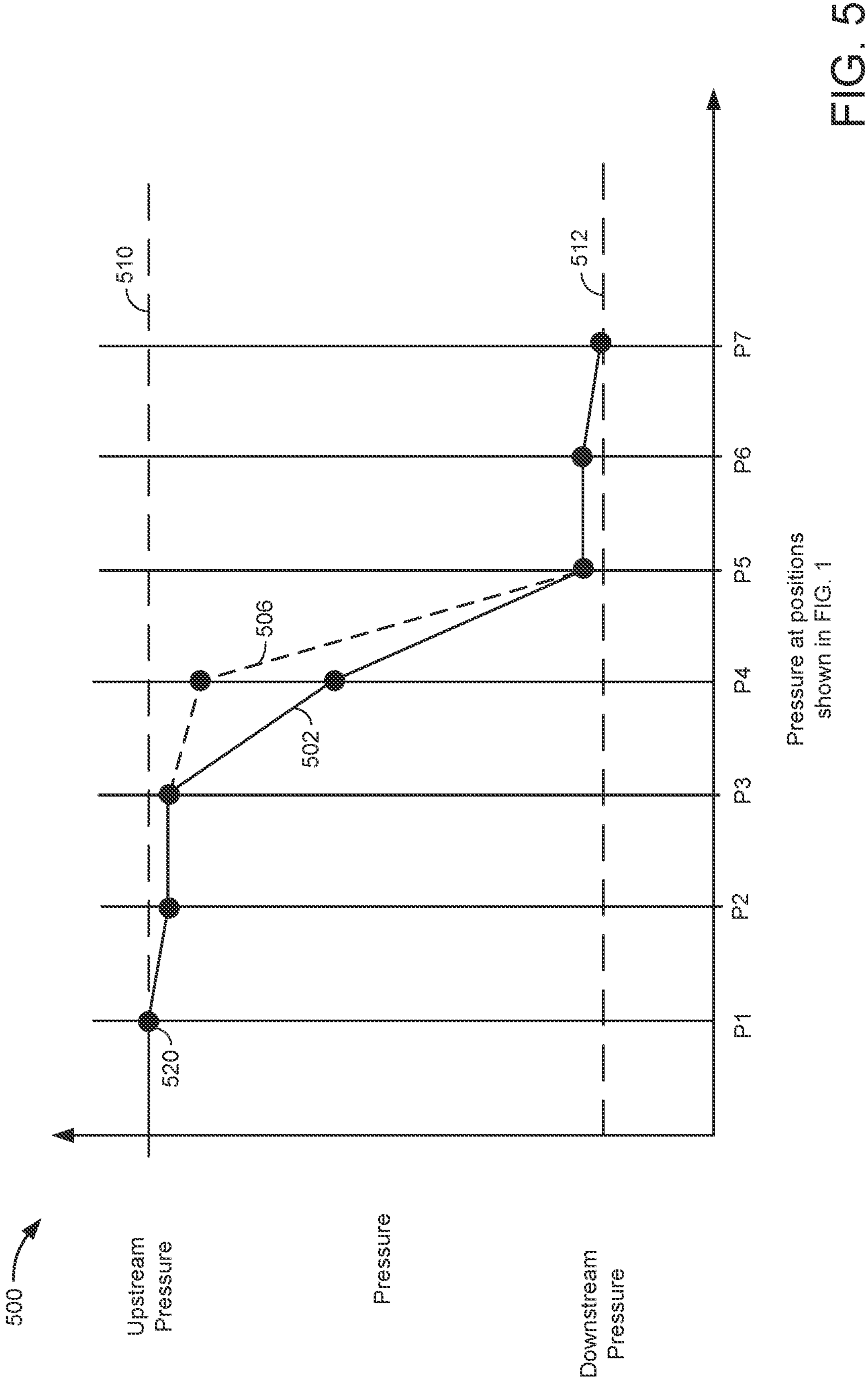
FIG. 5 shows a plot depicting pressures within the system of FIG. 1.
Figure 6:
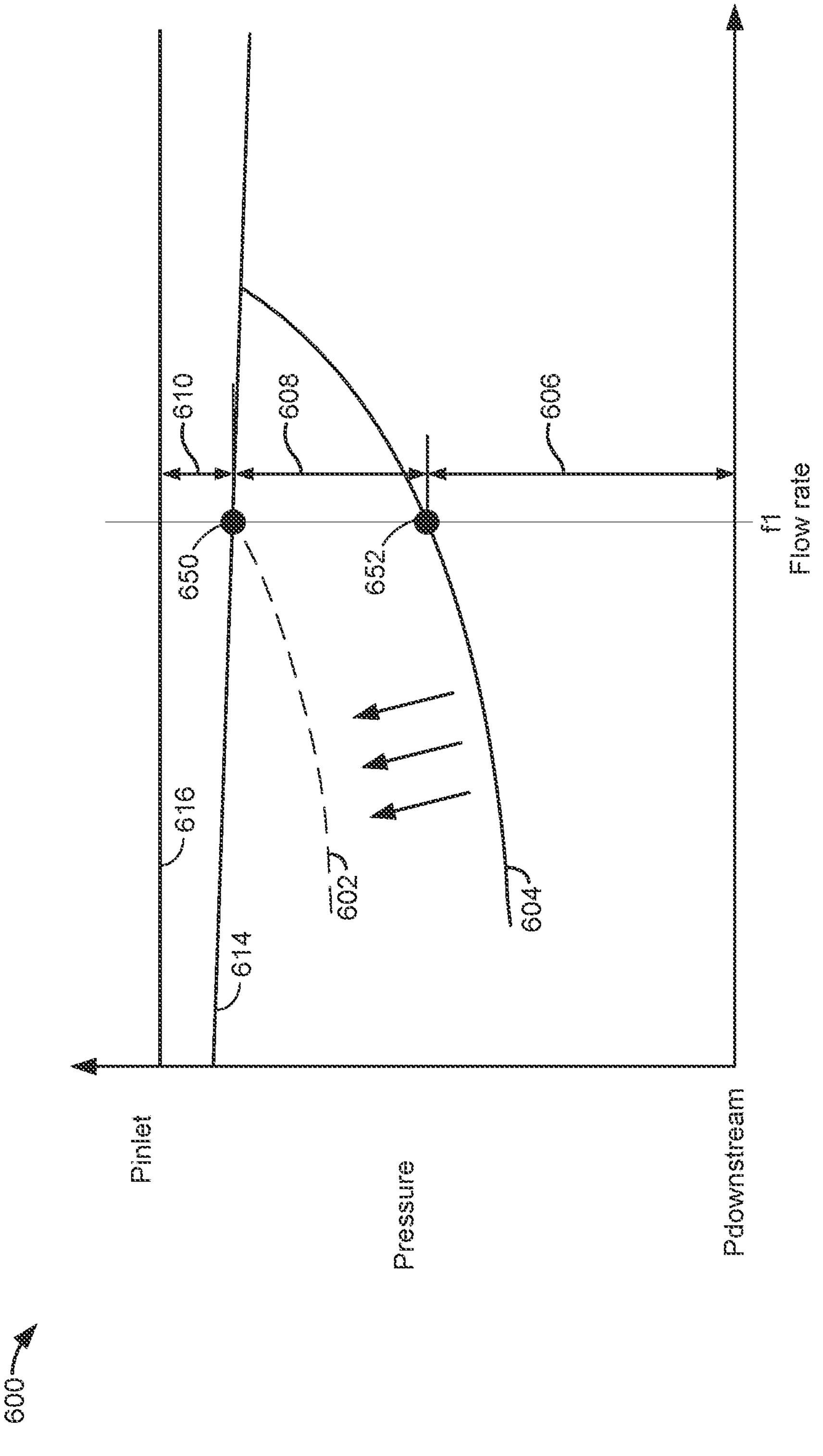
FIG. 6 shows a plot illustrating sources of pressure drop where adjusting hydroturbine speed may be beneficial.
Figure 7:
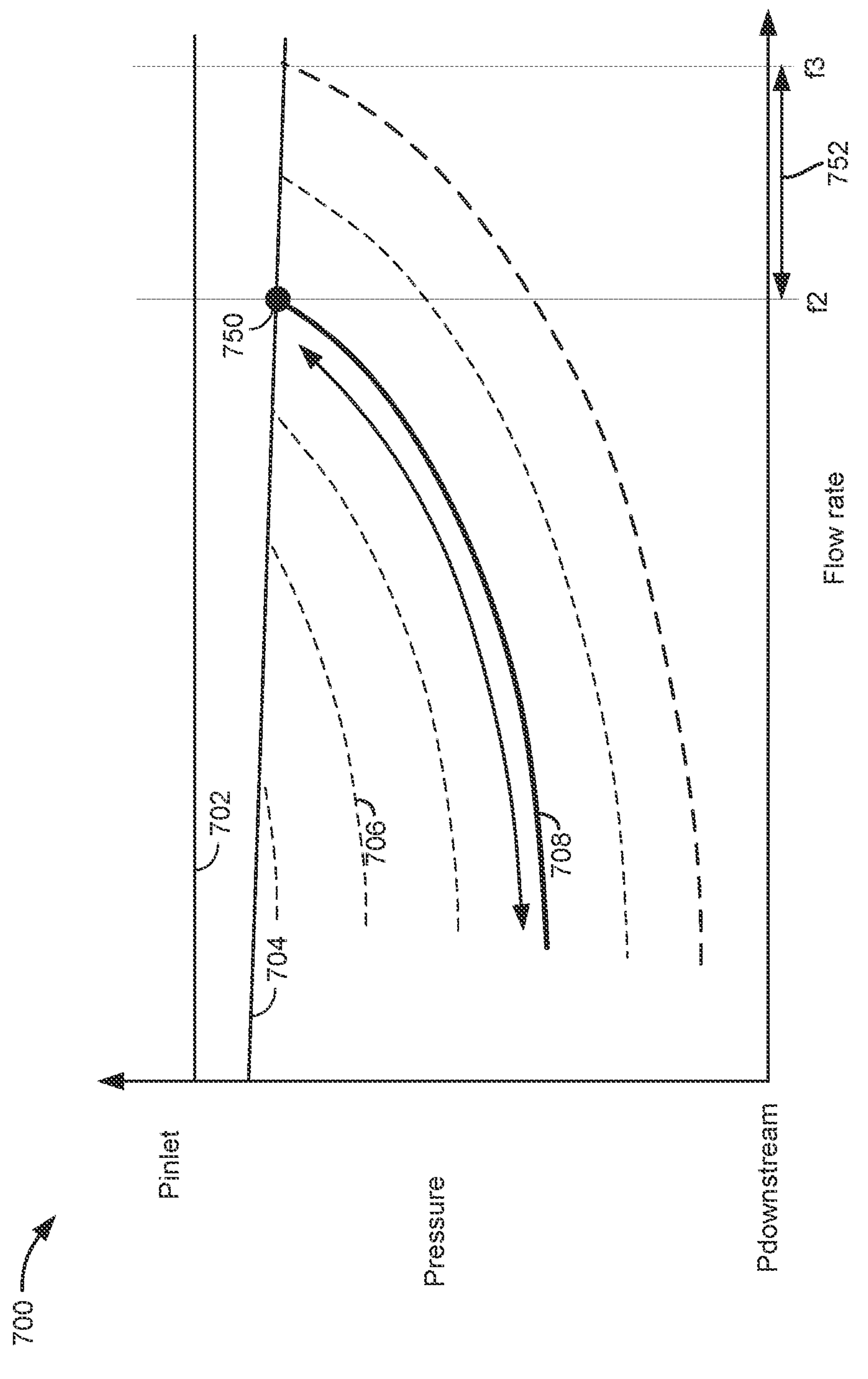
FIG. 7 shows a plot depicting a full operating range of a fixed speed hydroturbine versus a variable speed hydroturbine.
Figure 8:
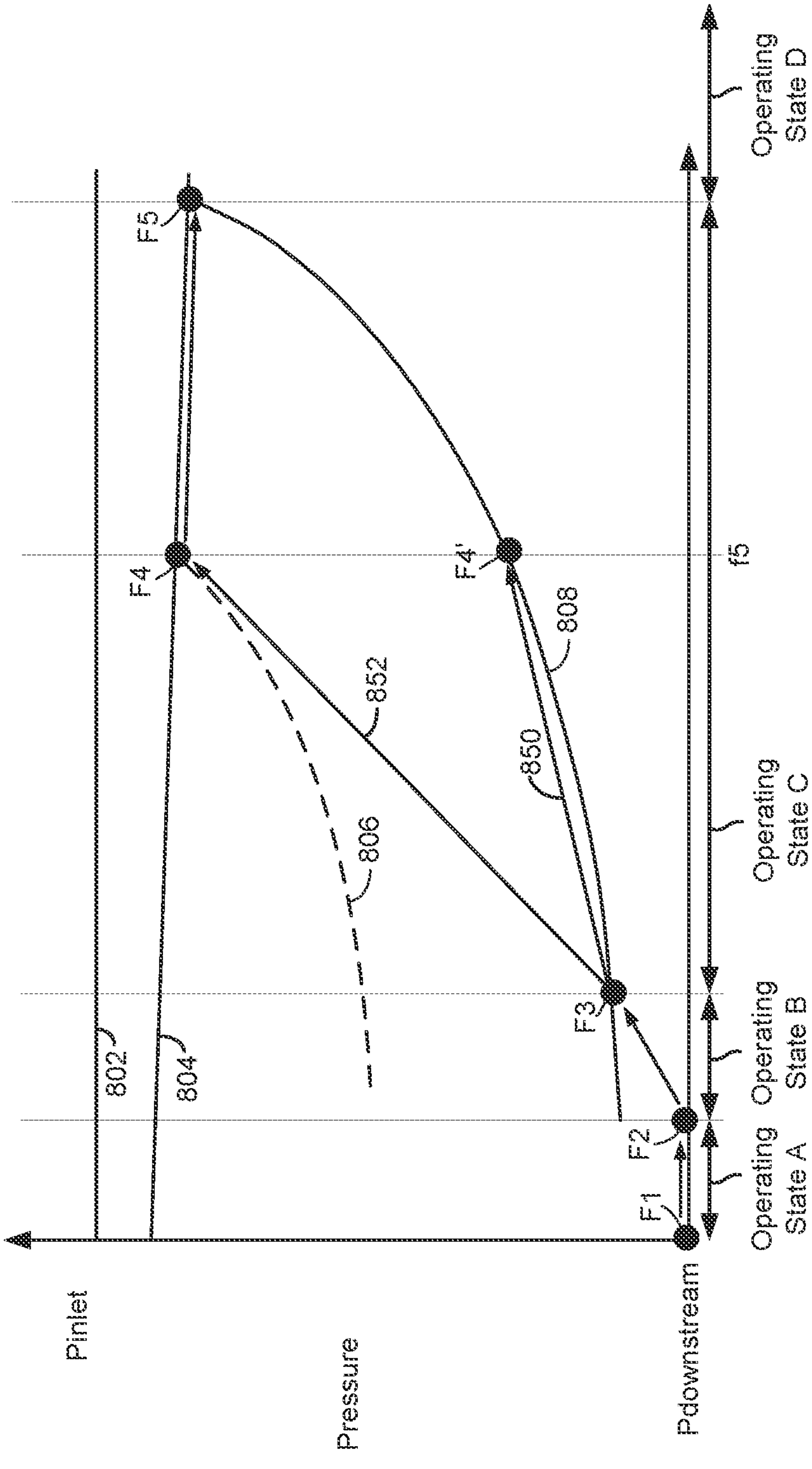
FIG. 8 shows a graphic representation of a hydroturbine operating sequence according to the method of FIGS. 2-4.

The present description is related to operating an electrical power generating system. In one example, the electrical power generating system may be configured as shown in FIG. 1. The electrical power generating system may be operated according to the method of FIGS. 2-4. In particular, the electrical power generating system may adjust a bypass valve or a hydroturbine speed (e.g., turbine speed) in response to a downstream pressure in the electrical power generating system. A plot of example pressure drops within an electrical power generating system is shown in FIG. 5. FIG. 6 shows operating conditions where adjusting a speed of a hydroturbine may be beneficial. A full operating range of a fixed speed turbine and a variable speed turbine is shown in FIG. 7. Finally, a graphical representation of operating the electrical power generating system of FIG. 1 according to the method of FIGS. 2-4 is shown in FIG. 8.

Referring to FIG. 1, electrical power generating system 100 is shown. Electrical power generating system 100 generates electrical power from energy of a fluid 158 (e.g., water) that flows through pipe or primary conduit 151. The electrical power that is generated may be supplied to a stationary electrical power grid 114. Stationary electrical power grid 114 may supply electrical power to electrical power consumers.

Pipe or primary conduit 151 includes a primary control valve 150 for controlling pressure of fluid 158 at a location in pipe or primary conduit 151 downstream of primary control valve 150. The fluid 158 flows in pipe or primary conduit 151 in a direction that is indicated by arrows 160 and

166. The fluid 158 may also flow into a bypass conduit 170 as indicated by arrow 162. The fluid 158 may also flow out of bypass conduit 170 as indicated by arrow 164. Upstream pressure of fluid 158 may be measured and determined via upstream pressure sensor 148. Downstream pressure of fluid 158 may be measured and determined via downstream pressure sensor 152. Thus, a downstream pressure is a pressure in primary conduit 151 that is downstream of primary control valve 150.

Bypass conduit 170 is positioned in parallel with pipe or primary conduit 151 and it includes an upstream isolation valve 144 and a downstream isolation valve 132. Flow meter 142 may output a signal that is indicative of a flow rate of fluid 158 through bypass conduit 170. A position of bypass control valve 138 may be monitored via position sensor 140. Midstream pressure sensor 141 provides an indication of pressure of fluid in bypass conduit 170 between bypass control valve 138 and hydroturbine 130. Hydroturbine 130 converts energy from fluid 158 into rotational energy. Fluid may exit hydroturbine 130 and pass through downstream isolation valve 132 as indicated by arrow 164.

Hydroturbine 130 may rotate electrical power generator 120 (e.g., an electric machine) to generate electrical power and a speed of hydroturbine 130 may be determined via a tachometer 122. Electrical power that is output from electrical power generator 120 is supplied to regenerative drive 118. Regenerative drive 118 converts electrical power generated via the electrical power generator 120 to alternating current (AC) power that may be supplied to the grid tie panel 116 and the stationary electrical grid 114. Regenerative drive 118 may include a rectifier 115 and an inverter 117. The rectifier 115 may convert AC power to DC power and the inverter may convert DC power to AC power at grid line frequency.

The electrical power generating system 100 may include a controller 12 to sense system operating conditions and adjust system actuators to adjust an operating state of the electrical power generating system 100. In one example, the controller 12 may include a central processing unit 104, random-access memory 106, read-only memory 102, and input output hardware 108 (e.g., buffer circuits, timers/counters, etc.). The controller 12 manages operation of the electrical power generating system 100 so that flow through the bypass conduit 170 is maximized while maintaining a desired pressure downstream of primary control valve 150. Additionally, fluid flow preferentially follows the path of least resistance between the primary conduit 151 and the bypass conduit 170. The combination of pressure drops through the various devices located along bypass conduit 170 is primarily driven by the position of bypass control valve 138 and the rotational speed of hydroturbine 130. Controller 12 may also include a user interface 110 to receive input from a user (e.g., human) and to provide feedback data to the user. User interface may be a touch screen display, keypad, or other known device. In some examples, controller 12 may also receive input and or commands from an external controller via I/O 108.

Pressures at various locations along bypass conduit 170 are indicated by a letter "P" followed by a location number. For example, "P1" is a fluid pressure at location P1, which is an inlet of the bypass conduit 170. P2 is pressure at an exit of the upstream isolation valve 144. P3 is pressure between flow meter 142 and bypass control valve 138. P4 is pressure between bypass control valve 138 and hydroturbine 130. P5 is pressure at the outlet of the hydroturbine. P6 is pressure at the inlet of the downstream isolation valve 132. P7 is pressure at the exit of the downstream isolation valve 132.

Thus, the system of FIG. 1 provides for an electrical power generating system, comprising: a bypass conduit including a bypass control valve and a turbine; a primary conduit including a primary control valve; and a controller including executable instructions stored in non-transitory memory that causes the controller to adjust a speed of the turbine in response to a downstream pressure. In a first example, the electrical power generating system includes where the adjusting the speed of the turbine includes decreasing a speed of the turbine when a downstream pressure is not greater than the desired downstream pressure minus a first offset pressure. In a second example that may include the first example, the electrical power generating system includes where the adjusting the speed of the turbine includes increasing the speed of the turbine when the downstream pressure is greater than the desired downstream pressure plus a second offset pressure. In a third example that may include one or both of the first example and the second example, the electrical power generating system includes where the adjusting the speed of the turbine includes maintaining the speed of the turbine when the downstream pressure is greater than the desired downstream pressure minus the first offset pressure and not greater than the desired downstream pressure plus the second offset pressure. In a fourth example that may include one or more of the first through third examples, the electrical power generating system includes where the desired downstream pressure is a pressure in the primary conduit downstream of the primary control valve. In a fifth example that may include one or more of the first through fourth examples, the electrical power generating system includes where the controller adjusts the speed of the turbine via commanding a regenerative drive. In a sixth example that may include one or more of the first through fifth examples, the electrical power generating system includes where the regenerative drive includes a rectifier and an inverter. In a seventh example that may include one or more of the first through sixth examples, the electrical power generating system further comprises additional executable instructions that cause the controller to adjust the bypass control valve in response to the desired downstream pressure.

The system of FIG. 1 also provides for an electrical power generating system, comprising: a bypass conduit including a bypass control valve and a turbine; a primary conduit including a primary control valve; and a controller including executable instructions stored in non-transitory memory that causes the controller to operate the electrical power generating system in a plurality of operating states including a fourth operating state where a speed of the turbine is adjusted in response to a downstream pressure. In a first example, the electrical power generating system includes where the plurality of operating states includes a first operating state where the speed of the turbine is zero and the bypass control valve is fully closed. In a second example that may include the first example, the electrical power generating system includes where the plurality of operating states includes a second operating state where the speed of the turbine is zero and the bypass control valve is partially opened. In a third example that may include one or both of the first and second examples, the electrical power generating system includes where the plurality of operating states includes a third operating state where the speed of the turbine is a minimum non-zero speed and the bypass control valve is partially opened. In a fourth example that may include one or more of the first through third examples, the electrical power generating system includes where the plurality of operating states includes a fifth operating state where the speed of the turbine is maintained and the bypass control valve is fully opened.

Referring now to FIG. 2, a flow chart of a method for operating the electrical power generating system of FIG. 1 is shown. The method of FIG. 2 may be applied to the system of FIG. 1 along with the methods of FIGS. 3 and 4. The method of FIG. 2 may be performed via a controller. The controller may receive inputs from sensors and adjust actuators to change operating states of devices in the physical world. The method of FIG. 2 may maximize power output of the electrical power generating system by increasing a pressure drop across a hydroturbine.

At 202, method 200 determines operating conditions and parameters for the electrical power generating system. In one example, method 200 may receive input values from the various sensors that are described herein to determine bypass valve position, hydroturbine speed, upstream pressure, downstream pressure, bypass conduit flow, and midstream pressure. Method 200 may retrieve values of control parameters from controller memory. The control parameters may be stored in tables, functions, or other memory locations. Method 200 proceeds to 204.

At 204, method 200 judges whether or not a run command has been received or input to the electrical power controller. If so, the answer is yes and method 200 proceeds to 206. Otherwise, the answer is no and method 200 proceeds to 205.

At 205, method 200 assumes an off state. The off state comprises fully closing the bypass control valve and commanding hydroturbine speed to zero. Thus, fluid flow through the hydroturbine and bypass conduit is reduced to zero or nearly zero. Method 200 returns to 202.

At 206, method 200 judges whether or not a fluid flow rate through pipe or primary conduit 151 is greater than a starting threshold flow rate. In one example, the starting threshold flow rate may be based on pipe size or historical water demand. If so, the answer is yes and method 200 proceeds to 208. Otherwise, the answer is no and method 200 proceeds to 207.

At 207, method 200 assumes state A. State A comprises operating the bypass control valve in a pressure control mode according to the method of FIG. 3. State A also includes commanding the hydroturbine speed to zero. Thus, state A controls downstream pressure when flow through the fluid distribution system is insufficient to support a minimum non-zero hydroturbine speed (e.g., a speed where the hydroturbine may be operated to generate electrical power). Method 200 returns to 202.

At 208, method 200 judges whether or not a fluid flow rate through pipe or primary conduit 151 is greater than a minimum threshold flow rate. In one example, the minimum threshold flow rate may be based on pipe size or historical water demand. If so, the answer is yes and method 200 proceeds to 210. Otherwise, the answer is no and method 200 proceeds to 209.

At 209, method 200 assumes state B. State B comprises operating the bypass control valve in a pressure control mode according to the method of FIG. 3. State B also includes commanding the hydroturbine speed to a minimum non-zero rotational speed. Thus, state B controls a downstream pressure via adjusting a position of a bypass valve while a hydroturbine speed is increasing to a minimum operating speed for the hydroturbine. Method 200 returns to 202.

At 210, method 200 judges whether or not a fluid flow rate through pipe or primary conduit 151 is greater than a maximum threshold flow rate. In one example, the maximum threshold flow rate may be based on pipe size, historical water demand, or hydroturbine minimum operating speed. If so, the answer is yes and method 200 proceeds to 213. Otherwise, the answer is no and method 200 proceeds to 211.

At 211, method 200 assumes state C. State C comprises fully opening the bypass control valve and operating the hydroturbine in a pressure control mode according to the method of FIG. 4. Thus, state C maximizes the pressure drop across the hydroturbine and minimizes the pressure drop across the bypass valve to increase system efficiency. Method 200 returns to 202.

At 213, method 200 assumes state D. State D comprises operating the bypass control valve in a pressure control mode according to the method of FIG. 3. State D also includes maintaining the present hydroturbine speed. Thus, state D maximizes output of the electrical power generator when fluid flows through the system are high. Method 200 returns to 202.

In this way, method 200 may adjust an operating state of an electrical power generating system to increase electrical power generating efficiency. In particular, the method of FIG. 2 performs start-up and running control. For example, once a run command is issued, the bypass control valve set point or desired pressure is adjusted to 1-10 pounds/square inch (PSI), or preferably 2-5 PSI, greater than the downstream pressure setpoint of the primary control valve. If there is fluid flow through the primary conduit and the bypass valve is opening, fluid will begin to flow through the bypass conduit. Once fluid flow in the bypass conduit exceeds a starting threshold flow rate, there is sufficient flow for the electrical power generator to generate electrical power. Nevertheless, the hydroturbine has to be started. Therefore, the bypass control valve is operated in the pressure control mode and the regenerative drive adjusts hydroturbine speed to a minimum speed value. The regenerative drive adjusts an amount of torque that is applied via the power generator to the hydroturbine to achieve the desired minimum hydroturbine speed. The desired minimum hydroturbine speed may be in a range between 400-1200 revolutions/minute (RPM). The bypass valve is adjusted to full open position and the hydroturbine is operated in a pressure control mode whereby speed of the hydroturbine is adjusted via adjusting a torque that is applied to the hydroturbine by the power generator as commanded by the regenerative drive. Thus, a pressure differential across the bypass valve may be reduced and/or minimized and the pressure differential across the hydroturbine may be maximized to increase electrical power output. If demand on the system increases flow through the primary conduit above a threshold amount, the bypass valve may be commanded to pressure control mode while the hydroturbine speed is maintained so that electrical power may be generated while the desired downstream pressure is met.

Turning now to FIG. 3, a flow chart of a method for operating a bypass control valve in a pressure control mode is shown. The method of FIG. 3 may be applied to the system of FIG. 1 along with the methods of FIGS. 2 and 4. The method of FIG. 3 may be performed via a controller. The controller may receive inputs from sensors and adjust actuators to change operating states of devices in the physical world. The method of FIG. 3 may control a pressure drop across a bypass control valve in a bypass conduit.

At 302, method 300 determines operating conditions and parameters for the electrical power generating system. In one example, method 300 may receive input values from the various sensors that are described herein to determine downstream pressure. Method 300 may retrieve values of control parameters from controller memory. The control parameters may be stored in tables, functions, or other memory locations. Method 300 proceeds to 304.

At 304, method 300 judges whether or not a downstream pressure Pds (e.g., pressure at downstream sensor 152) is greater than a desired downstream pressure or setpoint pressure (Psp) minus an offset pressure (e.g., a pressure value between 0.1 to 2 PSI). If so, the answer is yes and method 300 proceeds to 306. Otherwise, the answer is no and method 300 proceeds to 305.

At 305, method 300 incrementally opens the bypass control valve. In one example, the bypass control valve may be further opened from its present position by a small amount (e.g., 0.5 percent of full valve stroke) by activating a solenoid valve that allows water to flow out of a closing chamber that controls a position of the bypass control valve. Method 300 returns to 302.

At 306, method 300 judges whether or not a downstream pressure Pds (e.g., pressure at downstream sensor 152) is greater than a desired downstream pressure or setpoint pressure (Psp) plus an offset pressure (e.g., a pressure value between 0.1 to 2 PSI). If so, the answer is yes and method 300 proceeds to 309. Otherwise, the answer is no and method 300 proceeds to 307.

At 307, method 300 holds or maintains a present opening amount of the bypass control valve. Method 300 returns to 302.

At 309, method 300 incrementally closes the bypass control valve. In one example the bypass control valve may be further closed from its present position by a small amount (e.g., 0.5 percent of full valve stroke) by activating a solenoid valve that allows water to flow into a closing chamber that controls a position of the bypass control valve. Method 300 returns to 302.

In this way, the bypass control valve position is adjusted in response to a downstream pressure in a primary conduit when a hydroturbine speed is not adjusted in response to the downstream pressure so that a desired downstream pressure may be provided downstream of the primary control valve when water is flowing through the bypass conduit and the primary conduit.

Moving on to FIG. 4, a flow chart of a method for controlling a pressure drop across a hydroturbine is shown. The method of FIG. 4 may be applied to the system of FIG. 1 along with the methods of FIGS. 2 and 3. The method of FIG. 4 may be performed via a controller. The controller may receive inputs from sensors and adjust actuators to change operating states of devices in the physical world.

At 402, method 400 determines operating conditions and parameters for the electrical power generating system. In one example, method 400 may receive input values from the various sensors that are described herein to determine downstream pressure. Method 400 may retrieve values of control parameters from controller memory. The control parameters may be stored in tables, functions, or other memory locations. Method 400 proceeds to 404.

At 404, method 400 judges whether or not a downstream pressure Pds (e.g., pressure at downstream sensor 152) is greater than a desired downstream pressure or setpoint pressure (Psp) minus an offset pressure (e.g., a pressure value between 0.1 to 2 PSI). If so, the answer is yes and method 400 proceeds to 406. Otherwise, the answer is no and method 400 proceeds to 405.

At 405, method 400 incrementally decreases hydroturbine speed. In one example, the hydroturbine speed may be decreased by commanding the regenerative drive to output a greater amount of electrical energy. Requesting the regenerative drive to produce a greater amount of electrical energy may cause the torque output of the power generator to increase, thereby slowing the hydroturbine. In this way, the torque output (e.g., torque that resists motion of the hydroturbine) of the power generator may be adjusted to control the hydroturbine speed. Method 400 returns to 402.

At 406, method 400 judges whether or not a downstream pressure Pds (e.g., pressure at downstream sensor 152) is greater than a desired downstream pressure or setpoint pressure (Psp) plus an offset pressure (e.g., a pressure value between 0.1 to 2 PSI). If so, the answer is yes and method 400 proceeds to 409. Otherwise, the answer is no and method 400 proceeds to 407.

At 407, method 400 holds or maintains a present hydroturbine speed. Method 400 returns to 402.

At 409, method 400 incrementally increases the hydroturbine speed. In one example, the hydroturbine speed may be increased by commanding the regenerative drive to output a lower amount of electrical energy. Requesting the regenerative drive to produce a lower amount of electrical energy may cause the torque output of the power generator to decrease, thereby allowing the speed of the hydroturbine to increase. Thus, the torque output (e.g., torque that resists motion of the hydroturbine) of the power generator may be adjusted to increase the hydroturbine speed. Method 400 returns to 402.

In this way, the speed of the hydroturbine may be adjusted in response to the fluid pressure in the primary conduit downstream of a primary valve. By adjusting the speed of the hydroturbine, the pressure drop across the hydroturbine is controlled to a desired downstream pressure drop.

The methods of FIGS. 2-4 provide for a method for an electrical power generating system, comprising: via a controller, adjusting a speed of a turbine in response to a downstream pressure in a fluid distribution system. In a first example, the method includes where the speed of the turbine is adjusted in response to flow in a fluid distribution system exceeding a first threshold flow. In a second example that may include the first example, the method further comprises adjusting a position of a bypass control valve in response to flow in the fluid distribution system being less than the first threshold flow. In a third example that may include one or both of the first and second examples, the method includes where the bypass control valve is adjusted in response to the downstream pressure in the fluid distribution system. In a fourth example that may include one or more of the first through third examples, the method includes where the bypass control valve is incrementally opened in response to the downstream pressure not being greater than a desired downstream pressure minus a first offset pressure. In a fifth example that may include one or more of the first through fourth examples, the method includes where the bypass control valve is incrementally closed in response to the downstream pressure being greater than the desired downstream pressure plus a second offset pressure. In a sixth example that may include one or more of the first through fifth examples, the method includes where the controller commands a regenerative drive to adjust the speed of the turbine.

Referring now to FIG. 5, a plot 500 of representative pressure drops in an electrical power generating system is shown. Solid line 502 represents pressure drops in an electrical power generating system with a fixed speed hydroturbine. Dashed line 506 represents pressure drops in a variable speed electrical power generating as shown in FIG. 1 when operated according to the methods of FIGS. 2-4. The dashed line 506 is equivalent to the solid line 502 when the dashed line 506 is not visible and the solid line 502 is visible. The dots (e.g., 520) represent pressures that are observed in the electrical power generating system at a position in the electrical power generating system (e.g., P1).

Horizontal line 510 represents a level or value of an upstream pressure. Horizontal line 512 represents a level or value of a downstream pressure. The horizontal axis represents positions at which pressure is measured and the positions correspond to the positions that are indicated in FIG. 1. For example, P1 in FIG. 1 is a position in the bypass conduit at an inlet of upstream isolation valve 144. P7 in FIG. 1 is a position in the bypass conduit at an outlet of downstream isolation valve 132. The vertical axis represents fluid pressure in the electrical power generating system and pressure increases in the direction of the vertical axis arrow.

It may be observed that the pressure drop at position P1 relative to the upstream pressure is zero. The pressure drop across the upstream isolation valve that results in the pressure at position P2 is minimal. Additionally, there is minimal pressure drop through the flow meter as indicated by the difference between pressure at P2 and pressure at P3. The pressure drop of the bypass control valve for a fixed speed hydroturbine (e.g., pressure indicated by solid line at P3 minus the pressure indicated by solid line at P4) is more significant. The pressure drop across the bypass control valve in a system with variable hydroturbine speed (e.g., pressure indicated by the dashed line at P3 minus the pressure indicated by dashed line at P4) is significantly less than for the fixed hydroturbine system. This allows for a larger pressure drop across the hydroturbine for increased output and system efficiency. The pressure drop across the hydroturbine for the fixed hydroturbine (e.g., the pressure indicated by the solid line at P4 minus the pressure indicated by the solid line at P5) is greater than the pressure drop across the bypass control valve for the fixed turbine, but less than the pressure drop across the hydroturbine for the variable hydroturbine (the pressure indicated by the dashed line at P4 minus the pressure indicated by the dashed line at P5). Thus, the variable speed hydroturbine may provide additional electrical power output when operated according to the method of FIGS. 2-4. The pressure drop between the outlet of the hydroturbine and the inlet of the downstream isolation valve (e.g., the pressure at P5 minus the pressure at P6) is negligible. The pressure drop across the downstream isolation valve (e.g., the pressure at P6 minus the pressure at P7) is relatively small.

Thus, the pressure drop across the bypass control valve may be minimized and the pressure drop across the hydroturbine may be maximized for the variable speed hydroturbine when the hydroturbine and bypass control valve are operated according to the method of FIGS. 2-4. The higher pressure drop across the bypass valve for the fixed speed hydroturbine creates a direct loss in electrical power generation potential for the fixed speed hydroturbine.

Referring now to FIG. 6, a plot 600 illustrating sources of pressure drop where adjusting hydroturbine speed may be beneficial is shown. The vertical axis represents pressures in the water distribution system and the horizontal axis represents fluid flow rate through the water distribution system.

Line 616 represents an inlet pressure for the electrical power generation system as sensed via upstream pressure sensor 148. Line 614 represents inlet pressure in the system minus losses in pressure from the inlet and outlet isolation valves, system piping, and minimum bypass valve pressure losses (e.g. a pressure and flow limited line). Dashed line 602 represents the pressure drop that may be provided via a variable speed hydroturbine for a given fluid flow rate through the water distribution system. Solid line 604 represents the pressure drop that is across a fixed speed hydroturbine for different fluid flow rates through the water distribution system.

Leaders 606, 608, and 610 represent system fluid pressure drops for the water distribution system at flow rate f1. Dots 650 and 652 correspond to pressures in the system at flow rate f1. Leader 610 represents a minimum pressure loss for piping, bypass control valve, and isolation valves. Leader 608 represents the extra pressure drop across the variable speed hydroturbine that may be available when the electrical power generation system is operated according to the methods of FIGS. 2-4. Leader 606 represents the pressure drop across the hydroturbine for a fixed speed hydroturbine. Notice that the pressure drops across the fixed and variable speed hydroturbines for increasing system fluid flow rate up to the pressure and flow limited line 614.

It may be observed that the pressure drop across the fixed speed hydroturbine changes with the fluid flow rate through the system. Therefore, the pressure drop across the bypass control valve may be adjusted to create the pressure difference between line 604 and line 614 so that the requested or desired downstream pressure may be generated via the electrical power generation system and primary control valve 150. However, the pressure drop across the bypass control valve results in wasted system energy.

The speed of the variable speed hydroturbine may be increased to increase a pressure drop across the hydroturbine, thereby increasing the output and efficiency of the hydroturbine. Consequently, to meet a desired downstream pressure in the water distribution system, less pressure drop may be provided via the bypass control valve.

Turning now to FIG. 7, a plot 700 that shows a full operating range of a fixed speed hydroturbine versus a variable speed hydroturbine is shown. The vertical axis represents pressures in the water distribution system and the horizontal axis represents fluid flow rate through the water distribution system.

Line 702 represents an inlet pressure for the electrical power generation system as sensed via upstream pressure sensor 148. Line 704 represents inlet pressure in the system minus losses in pressure from the inlet and outlet isolation valves, system piping, and minimum bypass valve pressure losses (e.g. a pressure and flow limited line). Dashed lines (e.g., 706) represent the pressure drops that may be provided via a variable speed hydroturbine for a given fluid flow rate through the water distribution system. Solid line 708 represents the pressure drop that is across a fixed speed hydroturbine for different fluid flow rates through the water distribution system.

FIG. 7 shows how the fixed speed hydroturbine and variable speed hydroturbine operating points or conditions are adjusted according to the fluid flow rate through the electrical power generating system. In particular, the fixed speed hydroturbine operation (e.g., solid line 708) moves from the left side of the plot to the right side of the plot and it reaches a maximum flow rate once the pressure drop from the hydroturbine can no longer increase at point 750.

Ideally the electrical power generating system would be sized so that it operates frequently at the pressure and flow limiting conditions (e.g., line 704). However, a fixed speed hydroturbine operates only at such conditions at one set of operating conditions (e.g., point 750). Because fluid flow demand may vary greatly over time, a fixed speed hydroturbine may leave a lot of potential energy to be extracted from the fluid. For a fixed speed hydroturbine operating at pressures and flows to the left of the flow and pressure limiting point of the fixed speed hydroturbine (e.g., 750), the extra pressure drop in the system is provided via the bypass control valve. For operating conditions that are to the right of the flow and pressure limiting point (e.g., point 750), fluid flow through the fixed speed hydroturbine is prevented and the additional system flow is provided via the primary control valve.

The present variable speed hydroturbine may be operated along the pressure and flow limited line 704 according to the method of FIGS. 2-4 to improve system efficiency. In addition, the maximum flow through the bypass conduit may be increased relative to flow through the bypass conduit of a fixed hydroturbine since the variable speed hydroturbine will not reach a pressure limiting condition. The variable speed hydroturbine may operate at increased flow rates between flow rate f2 and flow rate f3 to provide an increased flow range that is illustrated by leader 752. The greater flow rates may be achieved by decreasing hydroturbine speed at a given inlet pressure.

Referring now to FIG. 8, an electrical power generating system starting sequence is shown. The electrical power generating system as shown in FIG. 1 may be started and operated according to the method of FIGS. 2-4. The vertical axis represents pressures in the water distribution system and the horizontal axis represents fluid flow rate through the water distribution system.

Line 802 represents an inlet pressure for the electrical power generation system as sensed via upstream pressure sensor 148. Line 804 represents inlet pressure in the system minus losses in pressure from the inlet and outlet isolation valves, system piping, and minimum bypass valve pressure losses (e.g. a pressure and flow limited line). Dashed line (e.g., 806) represents the pressure drops that may be provided via a variable speed hydroturbine for a given fluid flow rate through the water distribution system. Solid line 808 represents the pressure drop that is across a fixed speed hydroturbine for different fluid flow rates through the water distribution system.

The electrical generating system may be initially in an off state as indicated by the dot F1. The off state may be present when there is no run command for the electrical power generating system. The bypass control valve is fully closed and the hydroturbine rotational speed is commanded to zero when the electrical generating system is in the off state. Thus, the regenerative drive may operate to hold the hydroturbine rotational speed at zero. If the electrical generating system receives a start or run command, the isolation valves and the bypass control valve may be opened so that fluid begins to flow in the bypass conduit, thereby entering operating state A. The fluid flow may increase so that flow through the bypass conduit reaches the level that is indicated at F2 whereby the electrical generating system reaches state B. Once the electrical generating system reaches the flow that is indicated at F2, the hydroturbine may be released from a stopped state and it may rotate.

The fluid flow through the bypass conduit may continue to increase with increased flow through the system and the downstream pressure may be controlled via controlling a position of the bypass valve. The bypass valve may reach a fully open position as flow through the system increases. The dot at F3 indicates the conditions when the bypass valve is fully opened. If fluid flow increases further due to increased demand, speed of the hydroturbine is adjusted via the regenerative drive so that pressure drop across the hydroturbine reaches the level show at dot F4 for a variable speed hydroturbine. However, for fixed speed hydroturbines, the pressure drop at flow rate f5 as indicated at dot F4' is lower than that of the variable speed hydroturbine as indicated at dot F4. If system flow demand is increased further, the variable speed hydroturbine follows the trajectory of line 804 from F4 to F5. The variable speed hydroturbine may operate in a pressure control mode where hydroturbine speed is adjusted to control the downstream pressure in operating state C as indicated. A fixed speed hydroturbine system would move along a minimum speed curve as indicated by solid line 808 from F4' to F5 for higher system flow demands. If flow demand is increased further beyond the flow at F5, then the bypass valve may be held full open and the hydroturbine speed may be maintained so that the electric power generating system operates in state D.

Thus, the bypass control valve and hydroturbine speed may be adjusted to control pressures in the electrical power generating system. The pressures may be adjusted to minimize a pressure drop across the bypass control valve and maximize the pressure drop across the hydroturbine. Accordingly, system efficiency and performance may be enhanced.

Note that the example control and estimation routines included herein can be used with various variable hydroturbine system configurations. The control methods and routines disclosed herein may be stored as executable instructions in non-transitory memory and may be carried out by the control system including the controller in combination with the various sensors, actuators, valves, regenerative drives, and other hydroturbine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the variable speed hydroturbine hardware components in combination with one or more controllers.

This concludes the description. The reading of it by those skilled in the art would bring to mind many alterations and modifications without departing from the spirit and the scope of the description. For example, fluid (e.g., water) distribution systems that support different fluid flow rates with differently sized hydroturbines could use the present description to advantage.

The invention claimed is:

1. An electrical power generating system, comprising:

a bypass conduit including a bypass control valve and a turbine;

a primary conduit including a primary control valve; and a controller including executable instructions stored in non-transitory memory that causes the controller to:

responsive to a fluid flow rate through the primary conduit being greater than a minimum threshold flow rate, adjust a speed of the turbine in response to a downstream pressure while the bypass control valve is fully open, where the downstream pressure is a pressure in the primary conduit downstream of the primary control valve.

2. The electrical power generating system of claim 1, where the adjusting the speed of the turbine includes decreasing the speed of the turbine when a downstream pressure is not greater than a desired downstream pressure minus a first offset pressure.

3. The electrical power generating system of claim 2, where the adjusting the speed of the turbine includes increasing the speed of the turbine when the downstream pressure is greater than the desired downstream pressure plus a second offset pressure.

4. The electrical power generating system of claim 3, where the adjusting the speed of the turbine includes maintaining the speed of the turbine when the downstream pressure is greater than the desired downstream pressure minus the first offset pressure and not greater than the desired downstream pressure plus the second offset pressure.

5. The electrical power generating system of claim 1, where the controller adjusts the speed of the turbine via commanding a regenerative drive.

6. The electrical power generating system of claim 5, where the regenerative drive includes a rectifier and an inverter.

7. The electrical power generating system of claim 1, further comprising additional executable instructions that cause the controller to:

responsive to a fluid flow rate through the primary conduit being less than the minimum threshold flow rate, adjust the bypass control valve in response to the downstream pressure while maintaining the speed of the turbine at zero or a minimum non-zero speed.

8. A method for an electrical power generating system, comprising:

responsive to a flow rate through a primary conduit being greater than a minimum threshold flow rate, via a controller, fully opening a bypass control valve and adjusting a speed of a turbine in a bypass conduit in response to a downstream pressure in a fluid distribution system, the downstream pressure being a pressure in the primary conduit downstream of a primary control valve, the bypass conduit parallel with the primary conduit, the bypass control valve positioned in the bypass conduit.

9. The method of claim 8, where the minimum threshold flow rate based on pipe size or historical water demand.

10. The method of claim 9, further comprising adjusting a position of the bypass control valve in response to the flow rate through the primary conduit being less than the minimum threshold flow rate.

11. The method of claim 10, where the bypass control valve is adjusted in response to the downstream pressure in the fluid distribution system.

12. The method of claim 11, where the bypass control valve is incrementally opened in response to the downstream pressure not being greater than a desired downstream pressure minus a first offset pressure.

13. The method of claim 12, where the bypass control valve is incrementally closed in response to the downstream pressure being greater than the desired downstream pressure plus a second offset pressure.

14. The method of claim 13, where the controller commands a regenerative drive to adjust the speed of the turbine.

15. An electrical power generating system, comprising:

a bypass conduit including a bypass control valve and a turbine;

a primary conduit including a primary control valve; and a controller including executable instructions stored in non-transitory memory that causes the controller to operate the electrical power generating system in a plurality of operating states including a fourth operating state where the bypass control valve is fully open, and a speed of the turbine is adjusted in response to a downstream pressure when a fluid flow rate through the primary conduit is greater than a minimum threshold flow rate, where the downstream pressure is a pressure in the primary conduit downstream of the primary control valve.

16. The electrical power generating system of claim 15, where the plurality of operating states includes a first operating state where the speed of the turbine is zero and the bypass control valve is fully closed.

17. The electrical power generating system of claim 16, where the plurality of operating states includes a second operating state where the speed of the turbine is zero and the bypass control valve is partially opened responsive to a flow rate through the primary conduit being below a starting threshold flow rate, the minimum threshold flow rate greater than the starting threshold flow rate.

18. The electrical power generating system of claim 17, where the plurality of operating states includes a third operating state where the speed of the turbine is a minimum non-zero speed and the bypass control valve is partially opened responsive to a flow rate through the primary conduit being above the starting threshold flow rate and below the minimum threshold flow rate.

19. The electrical power generating system of claim 18, where the plurality of operating states includes a fifth operating state where the speed of the turbine is maintained and the bypass control valve is fully opened responsive to a flow rate through the primary conduit being above a maximum threshold flow rate, the maximum threshold flow rate greater than the minimum threshold flow rate.

* * * * *